(12) United States Patent
Jorgensson et al.

(10) Patent No.: US 10,480,583 B2
(45) Date of Patent: Nov. 19, 2019

(54) VEHICLE WITH TRANSMISSION HAVING A SPLINE CONNECTION

(71) Applicant: Volvo Car Corporation, Gothenburg (SE)

(72) Inventors: Mathias Jorgensson, Stenungsund (SE); Jonas Forssell, Torslanda (SE); Jan Christian Holmstrom, Gothenburg (SE); Per-Arne Malm, Vastra Frolunda (SE); Ahmet Dzafic, Molndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 116 days.

(21) Appl. No.: 15/714,010

(22) Filed: Sep. 25, 2017

(65) Prior Publication Data

US 2018/0112716 A1 Apr. 26, 2018

(30) Foreign Application Priority Data

Oct. 24, 2016 (EP) .................................... 16195233

(51) Int. Cl.
*F16D 1/10* (2006.01)
*F16H 47/00* (2006.01)
(Continued)

(52) U.S. Cl.
CPC ................. *F16D 1/10* (2013.01); *F16D 1/06* (2013.01); *F16F 15/1207* (2013.01);
(Continued)

(58) Field of Classification Search
CPC ....... F16D 2001/103; F16H 2045/0221; F16H 47/00
(Continued)

(56) References Cited

U.S. PATENT DOCUMENTS 8,434,582 B2 * 5/2013 Bjorck ..................... F16D 1/10
180/383
8,485,798 B2 * 7/2013 Sheth .................... F04D 13/022
403/300

(Continued)

FOREIGN PATENT DOCUMENTS

| KR | 20030004690 A | 1/2003 |
| KR | 20070114860 A | 12/2007 |
| WO | 2016094514 A1 | 6/2016 |

*Primary Examiner* — Michael Leslie
(74) *Attorney, Agent, or Firm* — Snyder, Clark, Lesch & Chung, LLP

(57) ABSTRACT

The present invention relates to a vehicle comprising: an internal combustion engine operable to rotate a crank shaft of the internal combustion engine; a transmission; at least one driving wheel rotationally connected to the transmission; a damping system arranged between the internal combustion engine and the transmission for dampening irregularity motions of the crank shaft, the damping system comprising an output splined portion; wherein the transmission is arranged for controllably rotationally connecting the output splined portion of the damping system to provide torque from the internal combustion engine to the at least one driving wheel via the transmission, wherein the output splined portion of the damping system is adapted to mate with a splined portion of a coupling shaft of the transmission for connecting the crank shaft to the transmission via the damping system.

11 Claims, 9 Drawing Sheets

(51) Int. Cl.
*F16D 1/06* (2006.01)
*F16F 15/12* (2006.01)
*F16H 57/00* (2012.01)
*F16H 45/02* (2006.01)

(52) U.S. Cl.
CPC ......... *F16H 47/00* (2013.01); *F16H 57/0006* (2013.01); *F16D 2001/103* (2013.01); *F16H 2045/0221* (2013.01)

(58) Field of Classification Search
USPC ........................................ 60/338; 403/359.1
See application file for complete search history.

(56) References Cited

U.S. PATENT DOCUMENTS

2012/0137669 A1    6/2012    Parks et al.
2016/0252170 A1*    9/2016    Lindemann ............. F16H 41/24
                                                      415/122.1

* cited by examiner

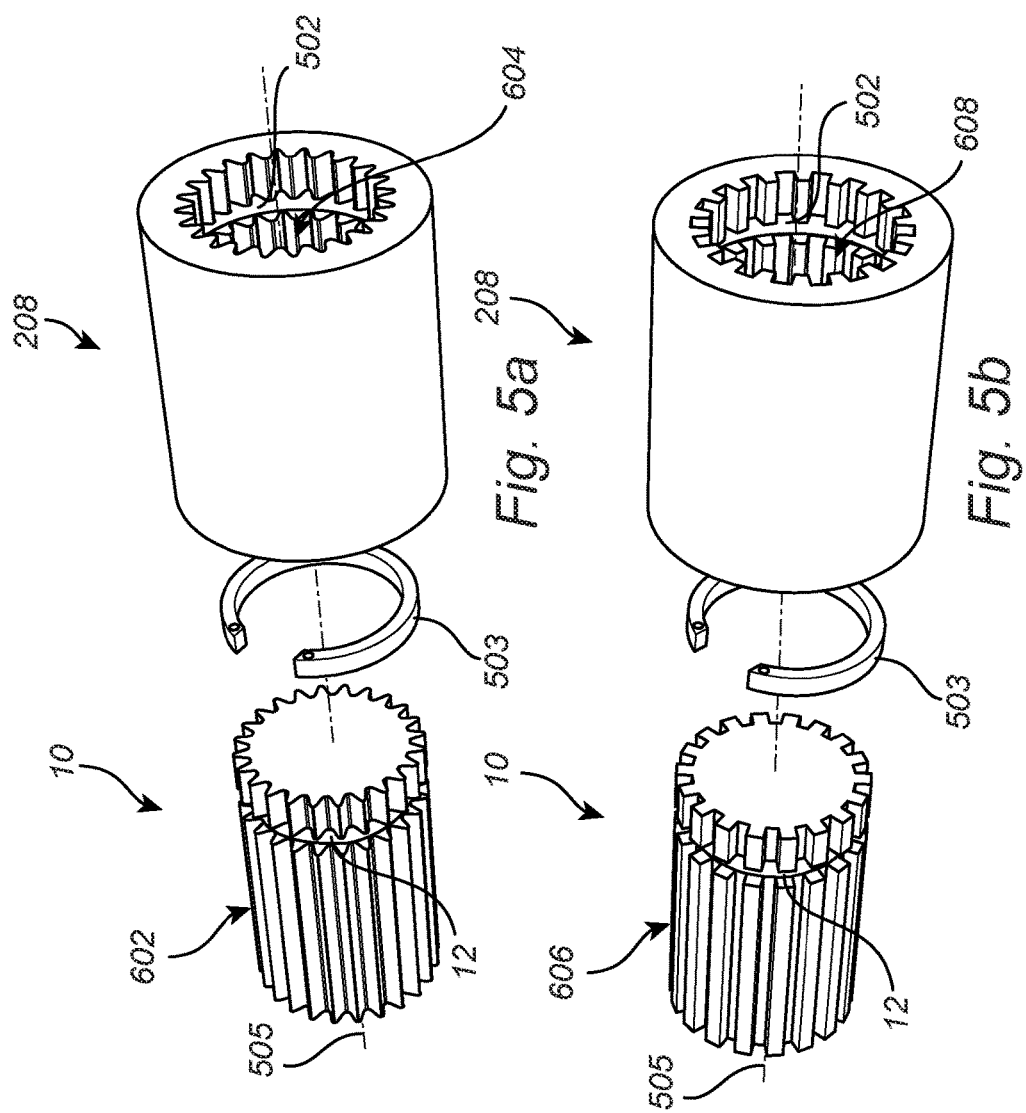

VEHICLE WITH TRANSMISSION HAVING A SPLINE CONNECTION

RELATED APPLICATION

This application claims priority under 35 U.S.C. § 119 based on European Patent Application No. 16195233.8, filed Oct. 24, 2016, the disclosure of which is hereby incorporated by reference herein.

FIELD OF THE INVENTION

The present invention relates to vehicle comprising a damping system and a torque converter connected to a driving wheel via a transmission.

BACKGROUND OF THE INVENTION

A vehicle generally comprises a power source such as an electric motor or an internal combustion engine (ICE) with a power output in the form of a rotating crank shaft. For automatic transmission vehicles, the rotating crank shaft is coupled to a torque converter and to a transmission in order to convert the rotating power output to torque for drive wheels. Conventionally, the crank shaft from the ICE is connected to the torque converter via a flexplate. Furthermore, the torque converter in an automatic transmission vehicle generally includes a lock-up clutch to eliminate slip in the torque converter. Moreover, a damper system is required for absorbing irregularities in the power output from the ICE which otherwise may be harmful for the transmission of the vehicle or create noise and vibrations. In case of a hybrid vehicle, additional components for a power take off for an electric motor may be located between the ICE and the transmission or directly connected to the transmission.

In addition to the above described components of a conventional vehicle powertrain, further components are needed to meet a present demand to increase the number of gears, improve the damping systems, increase torque output to the drive wheels, etc. Accordingly, as the vehicles become more sophisticated, the number of components in the powertrain of the vehicle appears to increase. This development is in contrast with the size of new vehicle models tending to be substantially the same compared to previous similar vehicle models, or even following a down-sizing trend.

One exemplary situation in which space is limited is for the installation of a flexplate. A flexplate is typically mounted between the crank shaft and the torque converter with screw joints. However, the installation length of the screw joints is relatively large in the cramped space between the torque converter and the ICE. In powertrain assembly the screw joints for the flexplate may thus lead to tedious and possibly time consuming work.

An example of a torque converter coupled to a crank shaft of a vehicle is described in KR20070114860. Here, the crank shaft from the ICE is directly connected to the torque converter via a spline connection. Torque fluctuations from the ICE will be directly transmitted to the spline connection which may not be a sustainable solution due to for example the durability of the spline connection and may in some cases (e.g. for a diesel ICE) create noise issues.

There is thus a need for a more compact solution for allowing controllable torque transmission between the ICE and the transmission of a vehicle.

SUMMARY

In view of above-mentioned and other drawbacks of the prior art, embodiments of the present invention provide a vehicle with a very compact solution for allowing controllable torque transmission between the ICE and the transmission.

According to a first aspect of the invention, there is provided a vehicle comprising: an internal combustion engine (ICE) operable to rotate a crank shaft of the internal combustion engine; a transmission; at least one driving wheel rotationally connected to the transmission; a damping system arranged between the internal combustion engine and the transmission for dampening irregularity motions of the crank shaft, the damping system comprising an output splined portion; wherein the transmission is arranged for controllably rotationally connecting the output splined portion of the damping system for providing torque from the internal combustion engine to the at least one driving wheel via the transmission, wherein the output splined portion of the damping system is adapted to mate with a splined portion of a coupling shaft of the transmission for connecting the crank shaft to the transmission via the damping system.

The transmission may be an automatic transmission with planetary gears or a continuously variable transmission for transmitting torque from the ICE to the driving wheels, such transmissions are known in the art.

The "irregularity motions" that may be dampened by the damping system should be interpreted as motions caused by irregularities in the power output of the ICE provided via the crank shaft. Such irregularities may for example be caused by the cyclic characteristics of a combustion engine generating power of different magnitude during for example the compression phase compared to in the combustion phase. In addition, the irregularities may be caused by translational sudden axial or radial movement of the crank shaft, or irregularities in the operation of the ICE, for example caused by bending motions of the crank shaft.

The splines according to embodiments of the invention may be different types of splines such as parallel key splines, involute splines, crowned splines, or serrations type splines, etc.

The present invention is based on the realization that a compact and flexible driveline solution can be achieved by placing the damping system on the ICE side of the transmission which thereby enables providing a spline connection between the transmission and the damping system. The damping system is connected to the ICE via the crank shaft. The spline connection provides a more compact solution since, for example in an automatic or hybrid vehicle the traditional flexplate (in automatic or hybrid vehicles) can be removed. Furthermore, the spline connection eliminates the need for bolting the crank shaft to the torque converter which contributes to a more compact drive line solution. Thus, the need for mounting of the flexplate or mounting bolts in a cramped space is eliminated; instead a damping system is arranged separate from the transmission.

Accordingly, embodiments of the present invention provide for a more compact torque conversion solution, in particular in the direction along the crank shaft.

According to embodiments of the invention, the transmission comprises a torque converter arranged for controllably rotationally connecting the output splined portion of the damping system to the transmission, wherein the coupling shaft is configured to connect the crank shaft to the torque converter via the damping system. By providing a spline connection between the torque converter and the damping system, a compact and flexible driveline solution comprising a torque converter can be achieved. The spline connection is possible by placing the damping system between the torque converter and the ICE since the unwanted torque fluctuations caused by irregularities in the power output is absorbed by the damping system before they reach the spline connection. Furthermore, the spline connection between the torque converter and the damping system highly simplifies the mounting of the torque converter.

A torque converter is a device configured to transfer rotating power from a prime mover, e.g. an internal combustion engine to a rotating load such as e.g. the transmission of a vehicle. On an input side of a torque converter an impeller is rotationally driven by the ICE, and on the output side a turbine drives the load. Between the impeller and the turbine there is typically a stator which is configured to alter oil (or the liquid responsible for the power transfer) flow from the turbine to the impeller for controlling the transfer of power (e.g. degree of power multiplication). A torque converter may further comprise a clutch such as a lock-up clutch known in the art. Torque converters are generally known in the art and will not be described further herein.

According to embodiments of the invention, the splined portion of the coupling shaft may comprise splined teeth externally arranged on the coupling shaft, and wherein the splined portion of the damping system comprises spline grooves arranged on an inner surface of the splined output portion and adapted to engage with the splined teeth of the coupling shaft. In other words, the splined portion of the damping system may comprise spline grooves on an annular inner surface of a generally cylindrical hole of a coupling part of the damping system. Preferably, the spline teeth of the coupling shaft are external on the shaft and are adapted to mate and engage with the mating inner splines of the splined output portion of the damping system.

The coupling shaft is thus configured to fit in the splined output portion such that the splined portions rotatably engage with each other. The spline connection prevents relative rotational motion between the coupling shaft and the splined output portion of the damping system. It one embodiment the output splined portion of the damping system is a shaft configured to mate with a splined portion of the torque converter comprising a cylindrical splined hole.

According to embodiments of the present invention, the coupling shaft comprising the splined portion is directly attached to the torque converter. In this embodiment, the coupling shaft is thus part of the torque converter and the coupling shaft is directly attached (e.g. mechanically fixated) to the input side of the torque converter.

According to embodiments of the invention, the vehicle may further comprise a connecting arrangement for connecting said torque converter with said damping system, said connecting arrangement comprising said coupling shaft and a lock plate on which said coupling shaft is attached, said connecting arrangement further comprising a locking mechanism for locking said first lock plate to said torque converter in such a way that the output splined portion of said damping system is rotationally connected to said transmission via said torque converter. In this way, a compact and robust way of connecting the coupling shaft with the torque converter is possible. The locking mechanism may for example be bolts for locking the lock plate to the torque converter, the bolts being arranged though through-holes of the lock plate. Other locking arrangements are of course also conceivable such as welding the lock plate to input side (impeller side) of the torque converter.

According to embodiments of the invention, a snap ring is arranged to prevent the coupling shaft to be disconnected from the splined output portion of the damping system. A snap ring provides a simple and compact yet robust way to lock the coupling shaft to the output splined portion of the damping system in the axial direction of the coupling shaft.

Further, the coupling shaft may comprise an outer circumferential groove, wherein the snap ring is adapted to be arranged in the groove, wherein when the coupling shaft is operably connected to the damping system the snap ring is expanded into an inner circumferential groove in the output splined portion of the damping system such to prevent movement of the coupling shaft in an axial direction with respect to the splined output portion of the damping system.

In one embodiment, the damping system comprises a primary side connected with the crank shaft, a damping member connected with the primary side for dampening the motions of the crank shaft, and a secondary side connected to the damping member and comprising the output splined portion.

The damping member of the damping system may be a spring. The spring may for example be arranged to dampen torsional motions of the crank shaft.

Alternatively, the damping system may be a hydraulic damping system or a friction damping system.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 5a-d illustrates examples of coupling shafts and output portions with spline connections.

DETAILED DESCRIPTION OF EXAMPLE EMBODIMENTS

Figure 1:
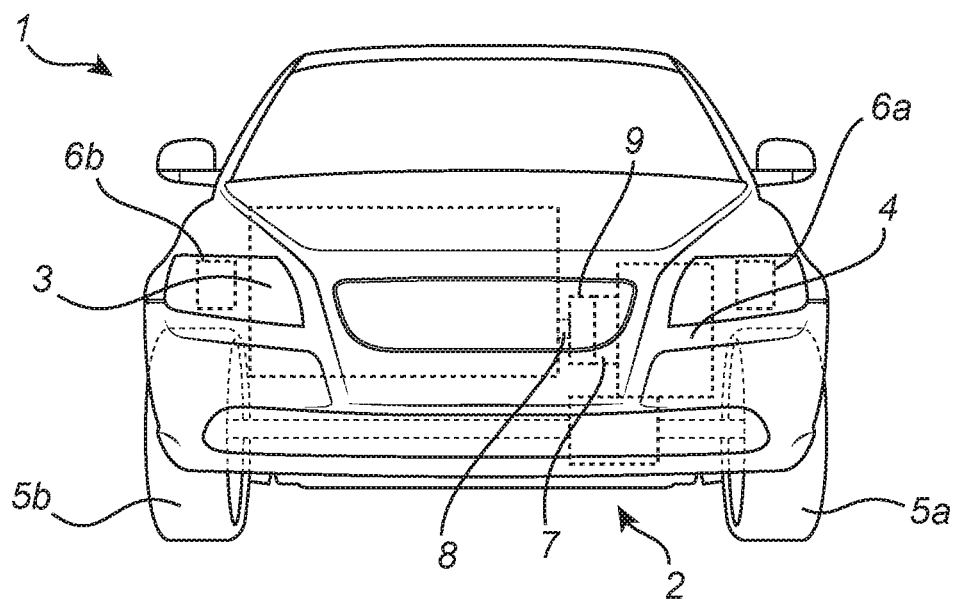
FIG. 1 schematically shows a vehicle according to an example embodiment of the present invention.

In the present detailed description, various embodiments of the system and method according to the present invention are mainly described with reference to a vehicle in the form of a car. However, the present invention mainly equally be used for other types of vehicles such as trucks and busses. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 schematically shows a hybrid vehicle in the form of a car 1 with a very schematic powertrain 2 indicated with dashed lines to illustrate the limited available transversal space between the side beams 6a, 6b (only conceptually shown) in the body of a modern car. Although not shown, the sub frame of the vehicle also limits the available transversal space for the power train 2.

As is schematically illustrated in FIG. 1, the powertrain 2 comprises an internal combustion engine (ICE) 3, a transmission 4, driving wheels 5a-b, a torque converter 7, and a damping system 9.

The damping system 9 is arranged between the ICE 3 and the transmission 4 for dampening motions of the crank shaft 8. Such motions are irregular motions caused by e.g. irregularities in the power output of the ICE transferred to the crank shaft 8. The torque converter 7 is arranged between the damping system 9 and the transmission 4 for controllably rotationally connecting an output splined portion (not shown in FIG. 1) of the damping system 9 with the transmission 4. Thereby, torque can be provided from the ICE 3 to the driving wheels 5a-b via the damping system 9, the torque converter 7 and the transmission 4.

Figure 2:
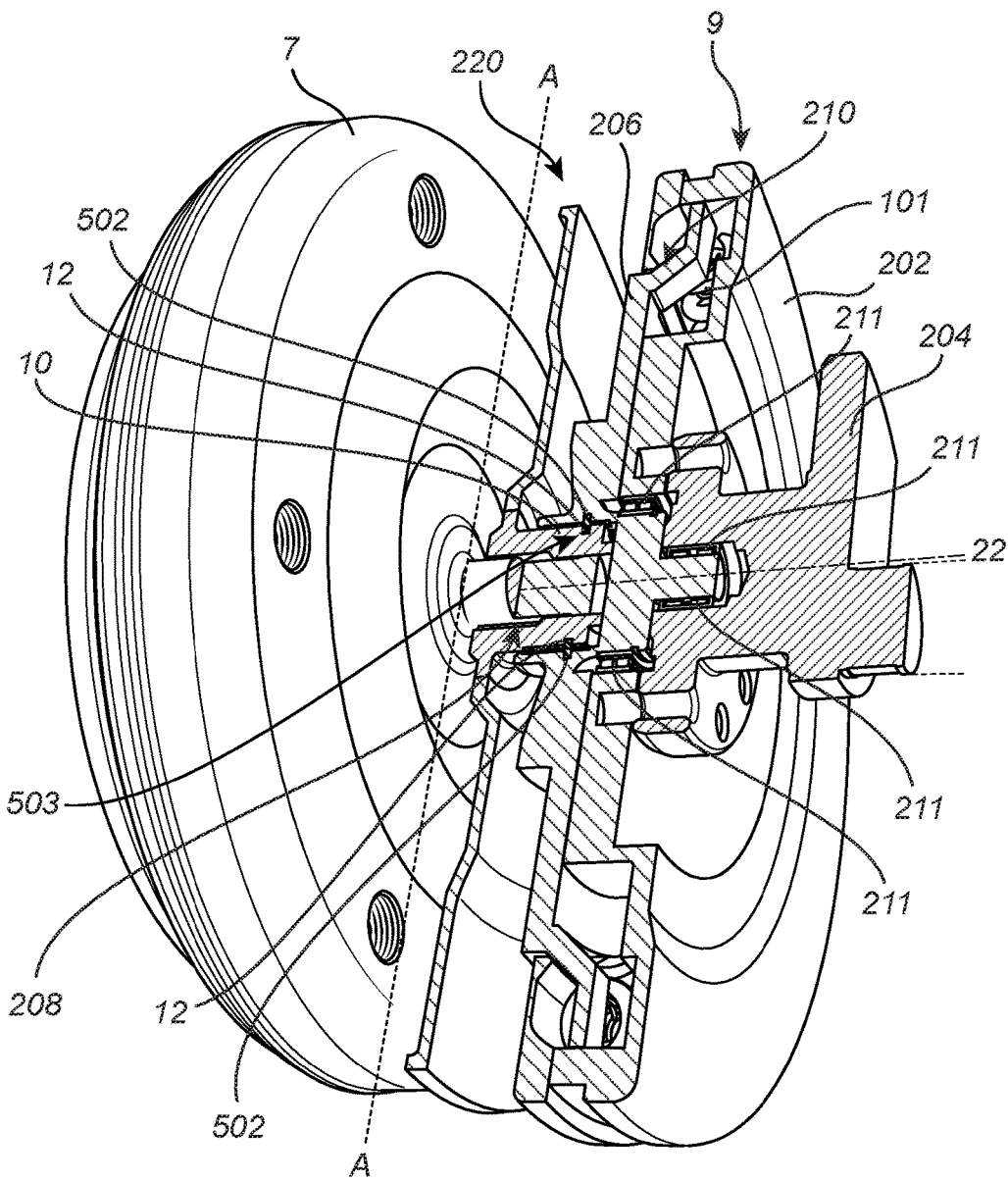
FIG. 2 conceptually illustrates a connection between a conceptual torque converter and a conceptual damping system.
Figure 6A:
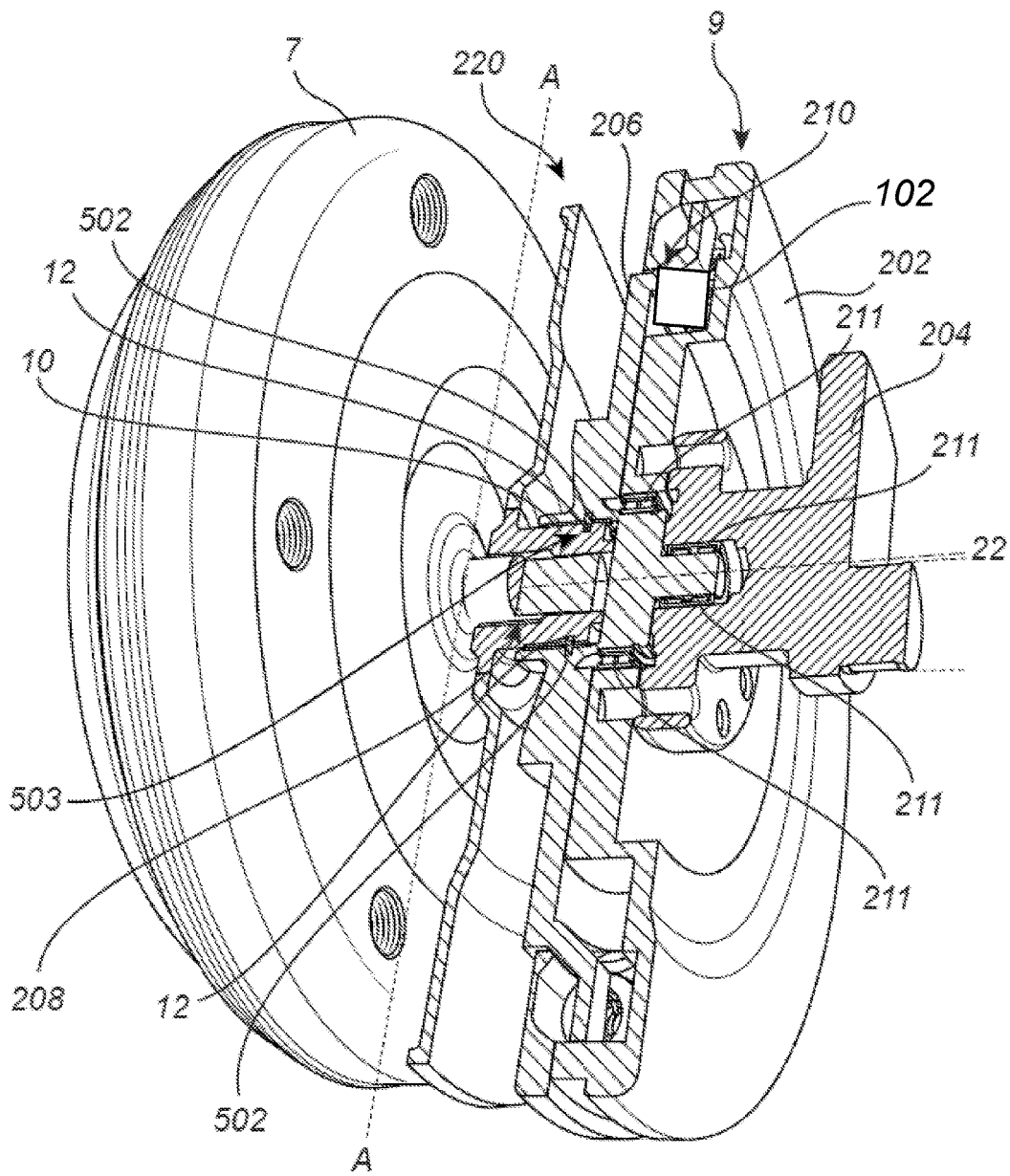
FIGS. 6a and 6b illustrate connections between a torque converter and a damping system in accordance with other implementations.
Figure 6B:
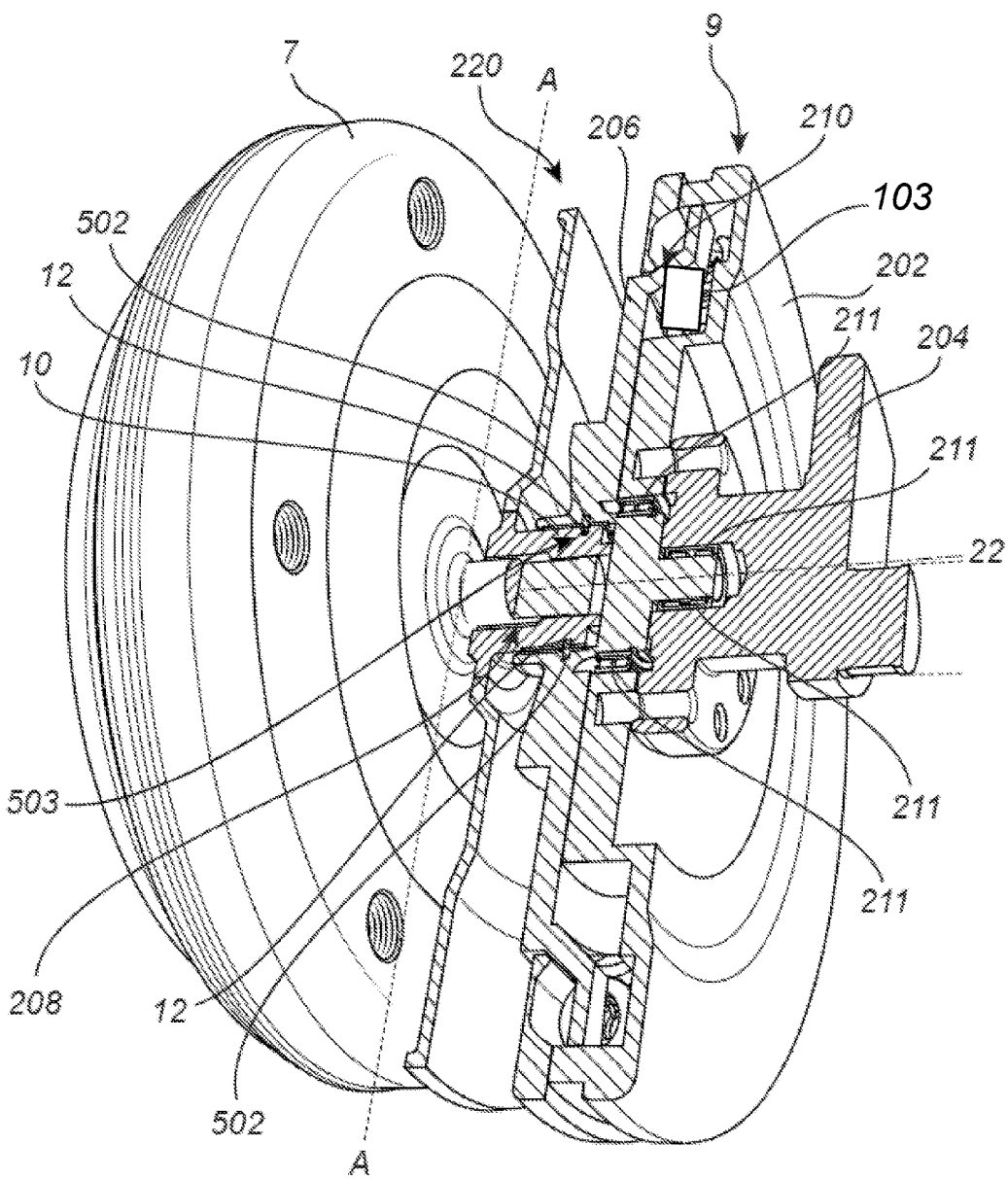

FIG. 2 conceptually shows a torque converter 7 connected to a damping system 9. In this embodiment, the damping system 9 comprises a primary side 202 connected with the crank shaft 204 and a secondary side 206 comprising a splined output portion 208 configured to engage with the splined coupling shaft 10 of the torque converter 7. The primary side 202 and the secondary side 206 are connected via a damping member in the form of a spring 101 annularly arranged on the primary side 202. The damping system shown here is a schematic representation of a damping system. In other embodiments, the damping system may be provided in the form of a hydraulic damping system, such as system 102 shown in FIG. 6a, in which a primary side and a secondary side are connected via a damping member being a fluid, for example hydraulic oil. Other example damping systems are friction based systems, such as system 103 shown in FIG. 6b, in which the primary and secondary sides are interconnected via a damping member in the form of a connecting interface surface between the primary side and the secondary side.

With further reference to FIG. 2, the damping system 9 is arranged between the torque converter 7 and the ICE (not shown) which is connected with the crank shaft 204. Thus, the damping is performed on the ICE side of the transmission comprising the torque converter 7. The crank shaft 204 may be rigidly connected with the primary side 202 of the damping system 9 with for example bolts (not shown). When the crank shaft 204 rotates to provide torque from the ICE, it rotates the primary side 202 which pushes the spring in a rotational manner against a flange 210 of the secondary side 206 which causes a torsional compression of the spring 101. Conceptually, the spring 101 transfers the rotational motion from the crank shaft 204 to the secondary side 206. The spring 101 acts as a damper to dissipate irregularities in the output from the ICE transferred to the crank shaft 204. Bearings 211 are arranged to allow a rotational motion of the primary side 202 with respect to the secondary side 206. The damping system 9 may be configured as a dual mass flywheel system with the primary side being a primary flywheel and the secondary side being a secondary flywheel. The spring may be an arc spring, and there may be for example two or more springs.

As further shown in FIG. 2, the torque converter 7 is connected to the damping system 9 via a connecting arrangement 220 comprising the coupling shaft 10 with a splined portion (not shown). Thus, in this embodiment, the coupling shaft 10 is part of the connecting arrangement 220 for connecting the damping system to the torque converter 7. However, in other embodiments (See e.g. FIG. 4), the coupling shaft 10 is directly connected to the torque converter 7 without the connecting arrangement 220. The coupling shaft is connected to the input (impeller) side of the torque converter 7.

Figure 3:
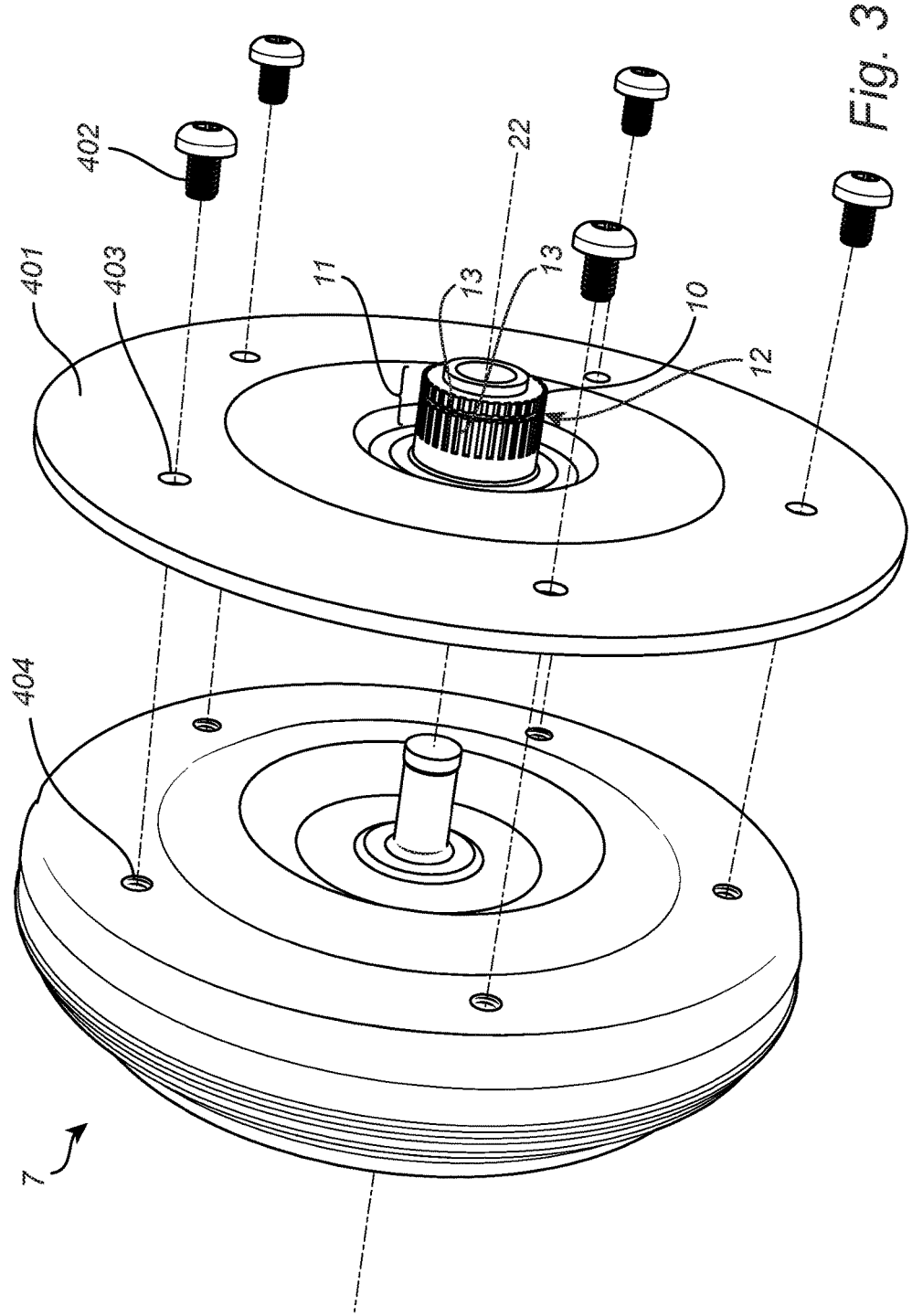
FIG. 3 conceptually illustrates a spline connection for a torque converter.

Now turning to FIG. 3 illustrating an exploded view of an exemplary connecting arrangement 220 for connecting the torque converter 7 with the damping system 9. The connecting arrangement 220 comprises the coupling shaft 10 having a splined portion 11 and an outer circumferential groove 12. The splines 13 of the splined portion 11 are configured to mate and engage with inner splines of the splined output portion 208 of the damping system 9. As illustrated in FIG. 3, the connecting arrangement 220 comprises a first lock plate 401 on which the coupling shaft 10 is attached. The first lock plate 401 is mechanically fixed with a locking mechanism 402 to the torque converter 7 in such a way that the output splined portion 208 (see FIG. 2) of the damping system 9 is rotationally connected to the transmission 4 via the torque converter 7. In this exemplary embodiment, the locking mechanism is a plurality of bolts (each numbered 402) which is arranged through a respective through-hole 403 and engaged in a threaded hole 404 in the torque converter 7. The first lock plate is mechanically fixed to the torque converter such that a rotation of the coupling shaft 10 causes a rotation of the input side (impeller) of the torque converter. Alternatively, the locking mechanism for the first lock plate may be weld joints for mechanically fixating the first lock plate to the torque converter 7.

Figure 4:
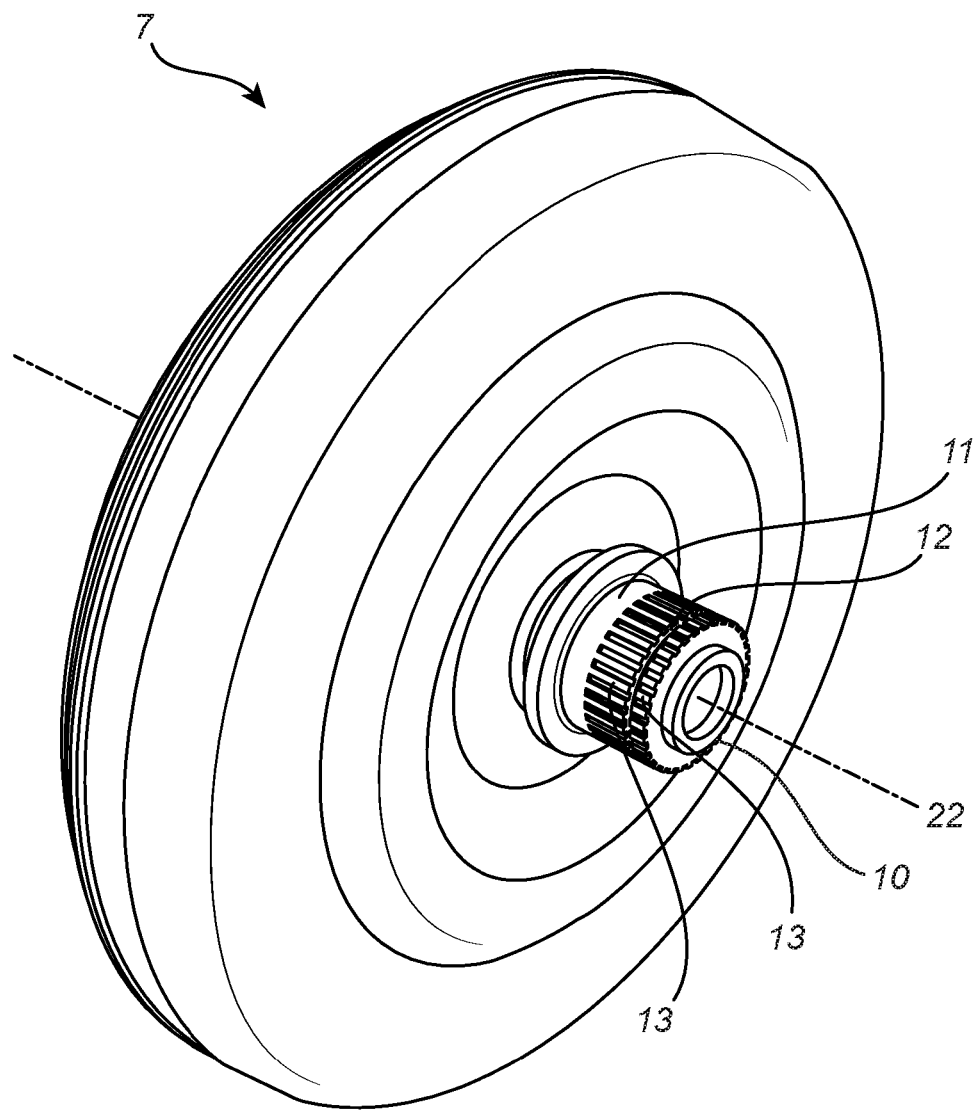
FIG. 4 conceptually illustrates a spline connection for a torque converter.

FIG. 4 illustrates another example of a coupling shaft 10 of a torque converter 7 according to an embodiment. In this example, the coupling shaft 10 is directly connected with the torque converter 7. Thus, the coupling shaft 10 is rigidly attached to torque converter (not shown) such that torque may be provided from the ICE to the driving wheels via the torque converter 7. The coupling shaft is rigidly attached to the input (impeller) side of the torque converter.

Now turning back to FIG. 2, the splined output portion 208 comprises an inner circumferential groove 502 into which a snap ring 503, configured to fit in the groove 12 of the coupling shaft 10, is expanded. In this way, the coupling shaft 10 is prevented to move in an axial direction (e.g. along the axis 22) with respect to the splined output portion 208 of the damping system 9. Thus, the coupling shaft 10 is axially locked in place in the splined output portion 208 of the damping system 9. Alternatively, the coupling shaft 10 is axially locked in place in the splined output portion 208 of the damping system 9 only by axial forces exerted on the torque converter 7 in the powertrain, without a snap ring.

Figure 5C:
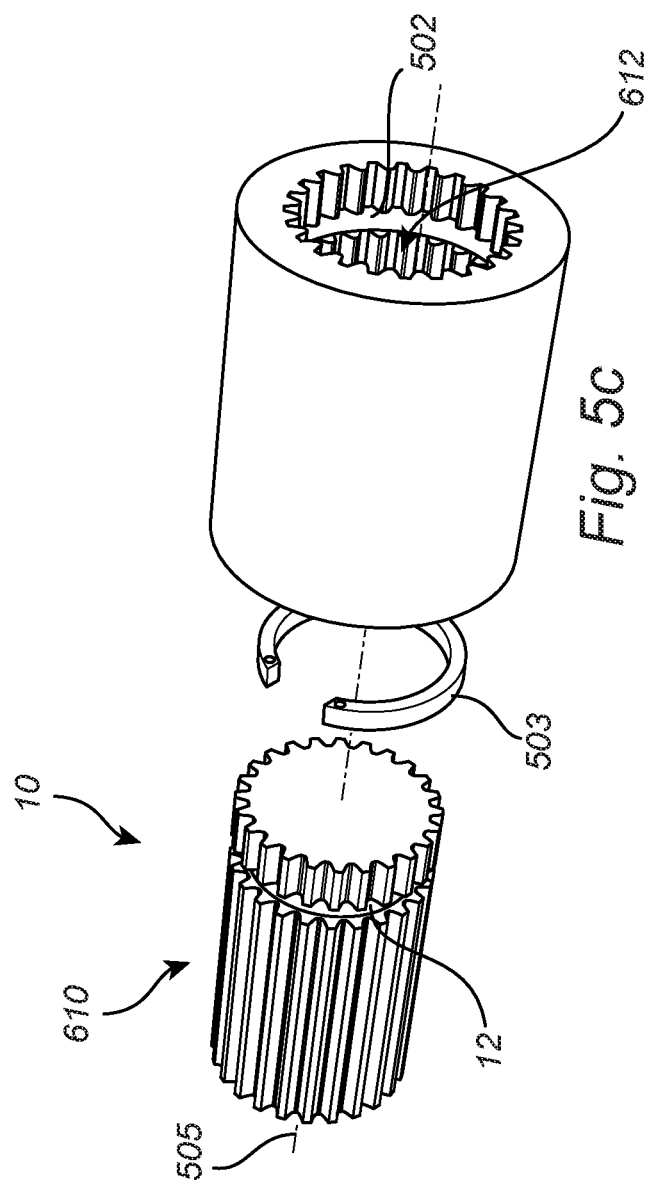

FIG. 5a-c illustrates three kinds of spline connections. In FIG. 5a, a coupling shaft 10 is conceptually shown having external spline teeth 602 being serrated splines. In this case, the spline teeth have a general V-shaped cross-section. The output portion 208 of the damping system 9 comprises corresponding spline teeth 604 on an inner surface of the output spline portion 208. The spline teeth 604 of the output spline portion 208 are also serrated splines and are adapted to engage with the spline teeth 602 of the coupling shaft 10. There is further shown a snap ring 503 adapted to fit in the annular outer circumferential groove 12 of the coupling shaft and to fit in the annular inner circumferential groove 502 of the output spline portion 208. The snap ring 503 is configured to be compressed in the groove 12 around the coupling shaft 10 and subsequently be expanded in the groove 502 of the output spline portion 208 for preventing axial movement (along the axis 505 of the coupling shaft) of the coupling shaft 10 with respect to the output spline portion 208.

In FIG. 5b, a coupling shaft 10 is conceptually shown having external spline teeth 606 being parallel key splines. In this case, the spline teeth have a general rectangular cross-section. The output portion 208 of the damping system comprises corresponding spline teeth 608 on an inner surface of the output portion. The spline teeth 608 of the output spline portion 208 are also parallel key splines and are adapted to engage with the spline teeth 606 of the coupling shaft 10. There is further a snap ring 503 with the function as described with reference to FIG. 5a.

In FIG. 5c, a coupling shaft 10 is conceptually shown having external spline teeth 610 being involute splines. In this case, the spline teeth have an involute cross-section which is tapered away from the rotation axis of the shaft 10. The output portion 208 of the damping system comprises corresponding involute spline teeth 612 on an inner surface of the output portion. The spline teeth 612 of the output spline portion 208 are also involute splines and are adapted to engage with the spline teeth 610 of the coupling shaft 10. There is further a snap ring 503 with the function as described with reference to FIG. 5a.

Figure 5D:
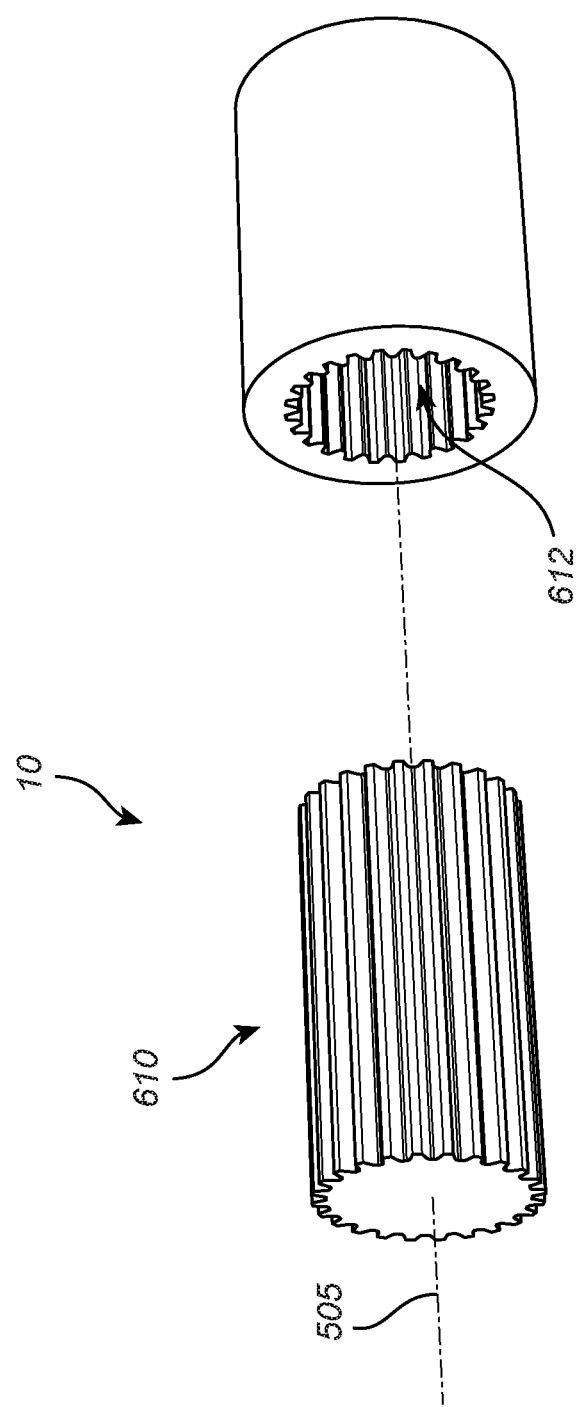

FIG. 5d shows an alternative spline connection in which a coupling shaft 10 is conceptually shown having external spline teeth 610 being involute splines. The output portion 208 of the damping system comprises corresponding involute spline teeth 612 on an inner surface of the output portion. The spline teeth 612 of the output spline portion 208 are also involute splines and are adapted to engage with the spline teeth 610 of the coupling shaft 10. The spline connection shown in FIG. 5d is axially held in place by external forces exerted on the spline connection from e.g. the torque converter or transmission and/or the damping system.

The person skilled in the art realizes that the present invention by no means is limited to the preferred embodiments described above. On the contrary, many modifications and variations are possible within the scope of the appended claims. For example, other types of spline connections are possible and within the scope of the claims. Furthermore, the invention is not limited to include the disclosed damping system; rather this damping system was conceptually shown to exemplify a damping system.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A vehicle comprising:
an internal combustion engine operable to rotate a crank shaft of said internal combustion engine;
a transmission;
at least one driving wheel rotationally connected to said transmission; and
a damping system arranged between said internal combustion engine and said transmission for dampening irregular motions of said crank shaft, said damping system comprising an output splined portion;
wherein said transmission is arranged for controllably rotationally connecting the output splined portion of said damping system for providing torque from the internal combustion engine to said at least one driving wheel via said transmission, wherein
said output splined portion of said damping system is adapted to mate with a splined portion of a coupling shaft of said transmission for connecting the crank shaft to said transmission via said damping system,
wherein said transmission comprises a torque converter arranged for controllably rotationally connecting the output splined portion of said damping system to said transmission, wherein said splined portion of said coupling shaft is configured to connect said torque converter to said damping system.

2. The vehicle according to claim 1, wherein said splined portion of said coupling shaft comprises splined teeth externally arranged on said coupling shaft, and wherein said splined portion of said damping system comprises splined teeth arranged on an inner surface of said splined output portion and adapted to engage with said splined teeth of said coupling shaft.

3. The vehicle according to claim 1, wherein said coupling shaft comprising the splined portion is directly attached to said torque converter.

4. The vehicle according to claim 1, further comprising:
a connecting arrangement for connecting said torque converter with said damping system, said connecting arrangement comprising said coupling shaft and a lock plate on which said coupling shaft is attached, said connecting arrangement further comprising a locking mechanism for locking said lock plate to said torque converter in such a way that the output splined portion of said damping system is rotationally connected to said transmission via said torque converter.

5. The vehicle according to claim 1, wherein a snap ring is arranged to prevent said coupling shaft to be disconnected from said splined output portion of said damping system.

6. The vehicle according to claim 5, wherein said coupling shaft comprises an outer circumferential groove, wherein said snap ring is adapted to be arranged in said groove, wherein when said coupling shaft is operably connected to said damping system said snap ring is expanded into an inner circumferential groove in said output splined portion of said damping system such to prevent movement of said coupling shaft in an axial direction with respect to said splined output portion of said damping system.

7. The vehicle according to claim 1, wherein said damping system comprises a primary side connected with said crank shaft, a damping member connected with said primary side for dampening said motions of the crank shaft, and a secondary side connected to said damping member and comprising said output splined portion.

8. The vehicle according to claim 1, wherein said damping system comprises a spring configured to absorb torsional vibrations in the crank shaft.

9. The vehicle according to claim 1, wherein said damping system is a hydraulic damping system.

10. The vehicle according to claim 1, wherein said damping system is a friction damping system.

11. The vehicle according to claim 1, wherein the vehicle is a hybrid vehicle or an automatic transmission vehicle.

* * * * *